(12) United States Patent
Miwa

(10) Patent No.: US 6,944,397 B2
(45) Date of Patent: Sep. 13, 2005

(54) DISTANCE MEASURING DEVICE

(75) Inventor: Yasuhiro Miwa, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/808,467

(22) Filed: Mar. 25, 2004

(65) Prior Publication Data

US 2004/0190888 A1 Sep. 30, 2004

(30) Foreign Application Priority Data

Mar. 25, 2003 (JP) ........................................ 2003-083420

(51) Int. Cl.$^7$ ............................ G03B 13/36; G01C 3/08
(52) U.S. Cl. ..................... 396/106; 396/120; 356/3.04
(58) Field of Search ................................. 396/106, 120; 356/3.04

(56) References Cited

U.S. PATENT DOCUMENTS

| | | | | |
|---|---|---|---|---|
| 5,001,508 A | * | 3/1991 | Ogawa | ........................ 396/120 |
| 5,107,449 A | * | 4/1992 | Ikuta | ......................... 702/159 |
| 6,188,843 B1 | | 2/2001 | Yoshida | |
| 6,188,844 B1 | | 2/2001 | Yoshida | |
| 6,415,241 B1 | | 7/2002 | Yoshida | |
| 6,452,664 B2 | * | 9/2002 | Miwa | ........................ 356/3.04 |
| 2004/0202462 A1 | * | 10/2004 | Miwa | ......................... 396/106 |

FOREIGN PATENT DOCUMENTS

| JP | 5-28093 | * | 2/1993 | ........... G06F/13/28 |
|---|---|---|---|---|
| JP | 2000-180713 | | 6/2000 | |

OTHER PUBLICATIONS

Englisn abstract of Japanese Patent No. JP5280973, Oct. 1993.*

* cited by examiner

Primary Examiner—W. B. Perkey
(74) Attorney, Agent, or Firm—Leydig, Voit & Mayer, Ltd.

(57) ABSTRACT

A distance measuring device includes light a projector for projecting a beam of light onto an object at a distance to be measured, a light detector for detecting the part of the beam of light reflected from the object and outputting an output signal, an integrator for discharging or charging an integration capacitor corresponding to the output signal to integrate the output signal, an analog-to-digital converter for converting the voltage of the integration capacitor after a predetermined number of repetitions of a distance measuring routine, and a detector for detecting the distance to the object based on the converted signal, wherein the number of repetitions of the distance measuring routine is set to saturate the integration capacitor through the repetition, when the object is located at a short range alarm position.

12 Claims, 8 Drawing Sheets

DISTANCE MEASURING DEVICE

BACKGROUND OF THE INVENTION

1. Field of the Invention

The present invention relates to a distance measuring device that measures the distance to an object, and more particularly to an active type distance measuring device suitably used for cameras or the like.

2. Related Background Art

Conventionally, as an active type distance measuring device used for cameras or the like, the following distance measuring device is known. That is, beam of light is projected from an infrared light emitting diode (hereinafter, referred to as "IRED") to an object to be measured, the reflected light of the projected beam of light is detected by a position sensitive detector (hereinafter, referred to as "PSD"), and the signal output from the PSD is calculated and processed by signal processing circuit and an arithmetic circuit and output therefrom as distance information; thereby the distance to the object to be measured is calculated by a CPU. Further, in the case where the distance measurement is made by only one light projection, an error may be generated. Accordingly, it is preferred that a distance measuring routine including light projection with light projecting means, light detection with light detecting means, output of output signal with light detecting means, and discharge or charge of an integration capacitor is carried out several times to obtain plural distance information, and the plural distance information are integrated by an integration circuit at predetermined intervals and averaged. The integration of the distance information with the integration circuit is made by discharging the integration capacitor; and from that state, a voltage corresponding to the distance information is applied to accumulate electric charge.

According to the distance measuring device as described above, the number of times of repetition of the distance measuring routine (hereinafter, referred to as "number of times of distance measuring routine") is uniformly set up in the following manner. That is, the number of times of the distance measuring routine is uniformly determined irrespective of the difference in the integration current and the capacity of integration capacitor depending on the individual product; and assuming an individual product of which capacity of the integration capacitor is the smallest and the integrated current is the largest in the difference range, and in such individual product, even when the amount of the accumulated charge is the largest (object to be measured is close), the amount of the accumulated charge does not exceed the capacity of the integration capacitor.

However, in the above distance measuring device, since the number of times of the distance measuring routine is uniformly determined, there may be a case that, when the capacity of the integration capacitor is large or the integrated current is small due to the difference of the product, the integration operation, in which the capacity of the integration capacitor is fully used, can not be made. Thus, satisfactory measuring accuracy is not obtained.

FIG. 8 is a timing chart of conventional distance measuring device in the case where the distance measurement is made at the closest distance capable of photographing for a camera. The abscissa axis represents integration time; and the ordinate axis represents voltage of the integration capacitor. Conventionally, the number of times of the distance measuring routine is fixed irrespective of the individual product. Therefore, as shown in FIG. 8, in an individual product (distance measuring device 1) of which capacity of the integration capacitor is the smallest and the integration current is the largest, electric charge is accumulated until the voltage of the integration capacitor reaches the substantially maximum value; thus the range of available AD signal value can be used effectively. However, in the case of many average individual products (distance measuring device 2), since the integration capacitor is not charged up to the maximum voltage, satisfactory resolution of the AD signal cannot be obtained; thus, accuracy of the distance measurement cannot be obtained. Further, in the individual product (distance measuring device 3), of which capacity of the integration capacitor is the largest and the integration current is the smallest, the utilization rate of the capacity of the integration capacitor and the range of the available AD signal value become lowest.

In order to solve the above problems, a distance measuring device disclosed in Japanese Unexamined Patent Application Publication (Tokukai) No. H5-280973 (Patent Document 1), it is arranged so that elements, which change the dynamic range such as the number of times of the distance measuring routine, integration time and the capacity of the integration capacitor, are controlled.

Patent Document 1: Japanese Unexamined Patent Application Publication (Tokukai) No. H5-280973

However, in the above distance measuring device, since it is arranged so that elements are changed every time of the distance measurement, the operation to calculate the distance becomes complicated and the measuring time becomes long. When the distance measuring time of the distance measuring device is long, in the case that the distance measuring device is used in a camera or the like, there are such problems that an appropriate shutter chance can not be obtained or the like.

SUMMARY OF THE INVENTION

Accordingly, an object of the present invention is to solve the above-described problems and to provide a distance measuring device capable of increasing the accuracy in the distance measurement without any complicated distance measuring processing.

In order to solve the above-described problems, a distance measuring device of the present invention comprises light projecting means for projecting beam of light onto an object to be measured, light receiving means for receiving reflected light of the beam of light projected onto the object to be measured and outputting output signal corresponding to the distance to the object to be measured, integration means for discharging or charging an integration capacitor corresponding to the output signal to integrate the output signal, an AD conversion means for AD converting the voltage of the integration capacitor after predetermined number of repeat of distance measuring routine including light projection with the light projecting means, light reception with the light receiving means, outputting of output signal with the light receiving means and discharging or charging the integration capacitor, and detection means for detecting the distance to the object to be measured based on the AD converted conversion signal, wherein the number of repeat of the distance measuring routine is set saturating the integration capacitor through the repeat, when the object to be measured is at a short range alarm position.

According to the above-described distance measuring device, since the number of times of the distance measuring routine is set up in accordance with the differences such as the integration current, the capacity of the integration capacitor or the like in each product, and thus, the value in which the voltage of the integration capacitor at the short range alarm position is saturated is obtained. Accordingly, it is possible to carry out the integration operation fully using the range of capacity of the integration capacitor. Here, "short range alarm position" means a position determined as the limit at the short range side where normal photographing for a camera without misfocussing is capable, and the camera is designed so that, in the case where the object to be measured is in a position nearer than that position, an alarm is emitted and the photographing is not carried out. In other words, "short range alarm position" is the nearest position that can be brought into a focal point by a camera to which the distance measuring device is applied. Also, "integration capacitor is saturated" means that, when the output signal is charged to integrate, the state where the integration capacitor is fully charged (the state where the integration capacitor has reached saturation voltage level); and when output signal is discharged to integrate, the state where the integration capacitor voltage is 0V. In this case, not only the state where the capacity is fully charged or completely 0V, but also, the following state is also included. That is, the capacity is almost fully charged or almost 0V to an extent that the range of the capacity of the integration capacitor is fully used.

Further, the distance measuring device in accordance with the present invention comprises light projecting means for projecting beam of light onto an object to be measured, light receiving means for receiving reflected light of the beam of light projected onto the object to be measured and outputting output signal corresponding to the distance to the object to be measured, integration means for discharging or charging an integration capacitor corresponding to the output signal to integrate the output signal, an AD conversion means for AD converting the voltage of the integration capacitor after predetermined number of repeat of distance measuring routine including light projection with the light projecting means, light reception with the light receiving means, outputting of output signal with the light receiving means and discharging or charging the integration capacitor, and detection means for detecting the distance to the object to be measured based on the AD converted conversion signal, wherein the number of repeat of the distance measuring routine is set saturating the integration capacitor through the repeat, when the object to be measured is at the distance corresponding to the closest distance capable of photographing.

DESCRIPTION OF THE PREFERRED EMBODIMENTS

Figure 1:
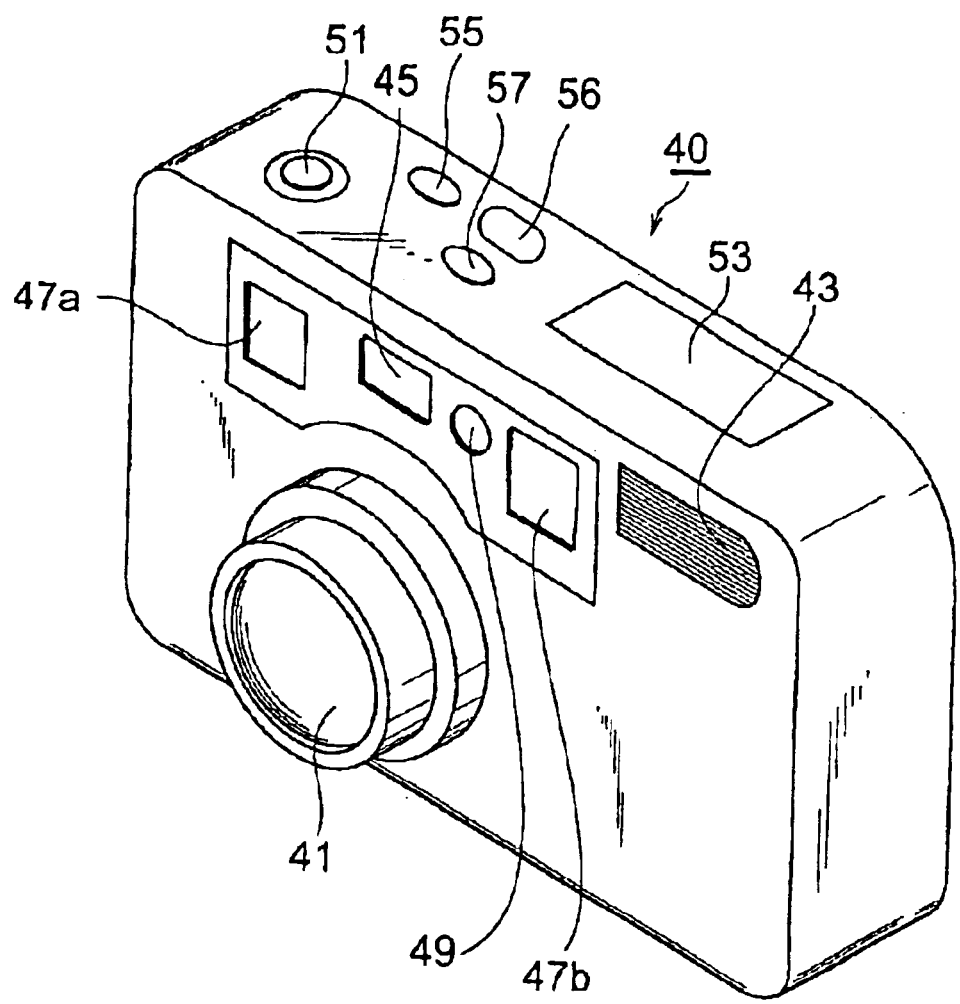
FIG. 1 is a perspective view of the front elevation of a camera in which a distance measuring device in accordance with this embodiment is used.

Hereinafter, embodiments in accordance with the present invention will be described. Identical elements will be given with identical reference numerals and letters, and redundant descriptions will be omitted.

FIG. 1 is a perspective view of the front elevation of a camera 40 in which a distance measuring device in accordance with this embodiment is used. As shown in FIG. 1, the camera 40 is equipped with a zoom lens barrel 41 provided with a photographic lens for imaging an object image on a silver film, an electric flash light emitting window 43 from which electric flash light is emitted, a viewfinder window 45 through which a photographer checks an object, an AF window (light projection) 47a in which an IRED (infrared light emitting diode) for projecting infrared ray onto the object is incorporated, an AF window (light reception) 47b in which a PSD (position sensitive detector) for receiving reflected light from the object is incorporated, a photometry window 49 in which a photometry sensor for measuring the luminance of the object is incorporated, and a shutter button 51 which the photographer operates to give instruction of shutter release, and so on.

Figure 2:
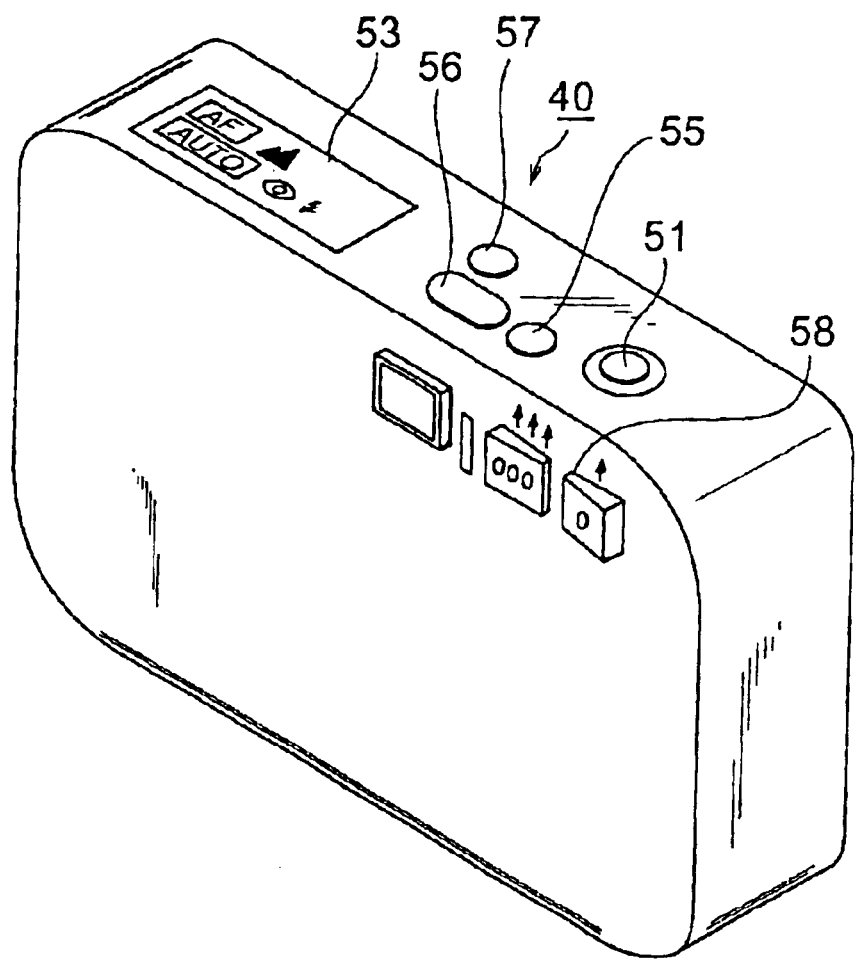
FIG. 2 is a perspective view of the rear elevation of the camera in which the distance measuring device in accordance with this embodiment is used.

FIG. 2 is a perspective view of the rear elevation of the camera 40. As shown in FIG. 2, the camera 40 is equipped with an LCD display panel 53 that displays a selected photographing mode or the like and date information or the like, a flash button 55 for setting light emitting mode of electric flash, a self timer button 56 for setting the mode of self timer, a date button 57 for setting date and time, and a zoom button 58 to instruct the photographing angle in the wide scope direction or the telescope direction.

Figure 3:
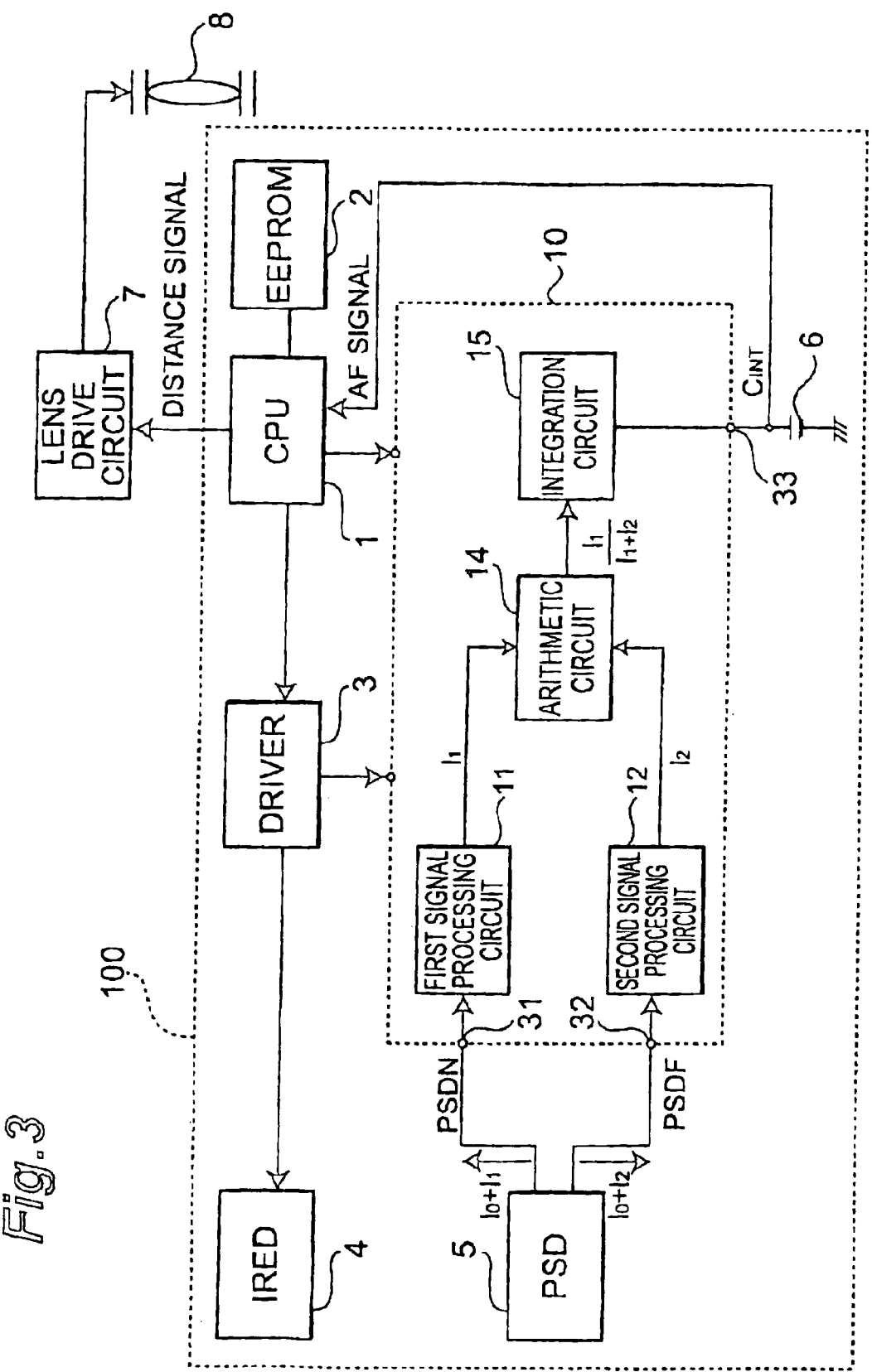
FIG. 3 is a diagram showing the configuration of a distance measuring device in accordance with the embodiment.

FIG. 3 is a diagram showing the configuration of the distance measuring device in accordance with the embodiment. As shown in FIG. 3, the distance measuring device 100 in accordance with the embodiment is provided with a CPU 1. The CPU 1 controls the entire camera, which is equipped with the distance measuring device 100. The CPU 1 controls the entire camera including the distance measuring device 100 based on the program and parameter which are previously stored in an EEPROM 2.

The distance measuring device 100 is provided with an IRED (infrared light emitting diode) 4. The IRED 4 serves as light projecting means that emits light and thereby projects projection beam onto an object to be measured. The IRED 4 is connected to the CPU 1 through a driver 3 and its light emission is controlled by the CPU 1.

The driver 3 receives power supply from a battery (not shown), which is included in the camera, and supplies the power to, in addition to the IRED 4, component parts of the camera such as AFIC 10 according to the control signal of the CPU 1; and for example, a driver IC is used therefor.

Further, the distance measuring device 100 is provided with a PSD (position sensitive detector) 5. The PSD 5 serves as light receiving means for receiving each reflected beam of the projection beam, which is projected onto the object to be measured from each IRED 4.

Furthermore, the distance measuring device 100 is provided with an auto-focusing. IC (hereinafter, referred to as "AFIC") 10. The AFIC 10 serves as signal processing means for processing the output signal from the PSD 5. The operation of the AFIC 10 is controlled by the CPU 1; and the AF signal (integration signal) output from the AFIC 10 is input to the CPU 1.

When projection beam of infrared light is emitted from the IRED 4, the projection beam is projected onto the object to be measured through a projection lens (not shown) disposed in front of the IRED 4. A portion of the projection beam is reflected, and is received at any point on the light receiving plane of the PSD 5 through the light receiving lens (not shown) disposed in front of the PSD 5. The light receiving position corresponds to the distance to the object to be measured. The PSD 5 outputs two signals $I_1$ and $I_2$ corresponding to the light receiving position.

The signal $I_1$ is a short-range side signal, in which, if the received light amount is at a fixed level, the closer distance results in the larger value; the signal $I_2$ is a long-range side signal, in which, if the received light amount is at a fixed level, the longer distance results in the larger value. The sum of the signals $I_1$ and $I_2$ represents the amount of the reflected light received by the PSD 5. The short-range side signal $I_1$ is input to the PSDN terminal of the AFIC 10; the long-range side signal $I_2$ is input to the PSDF terminal of the AFIC 10. However, practically, each signal of the short-range side signal $I_1$ and the long-range side signal $I_2$ with component of ambient light $I_0$ depending on the external conditions, is input to the AFIC 10.

The AFIC 10 is an integrated circuit (IC) and comprises a first signal processing circuit 11, a second signal processing circuit 12, an arithmetic circuit 14 and an output circuit 15.

The first signal processing circuit 11 receives the input, which is the signal $I_1+I_0$ output from the PSD 5, and after removing the component of the ambient light $I_0$ included in the signal, outputs the short-range side signal $I_1$. Also, the second signal processing circuit 12 receives the input, which is the signal $I_2+I_0$ output from the PSD 5, and after removing the component of the ambient light $I_0$ included in the signal, outputs the long-range side signal $I_2$.

The arithmetic circuit 14 receives the input of the short-range side signal $I_1$, which is output from the first signal processing circuit 11, and the long-range side signal $I_2$, which is output from the second signal processing circuit 12, and after operating the output ratio $(I_1/(I_1+I_2))$, outputs an output ratio signal representing the result. The output ratio $(I_1/(I_1+I_2))$ represents the light receiving position on the light receiving plane of the PSD 5; i.e., the distance to the object to be measured.

The output circuit 15 receives the input of the output ratio signal and integrates the output ratio multiple times along with the integration capacitor 6, which is connected to the CINT terminal of the AFIC 10; thereby the S/N ratio is improved. Here, the integration of the output ratio into the integration capacitor 6 is performed in such manner that the integration capacitor 6 in a discharged state is gradually charged corresponding to the output ratio signal.

Then, the integrated output ratio is output from the SOUT terminal of the AFIC 10 as AF signal (integration signal). The CPU 1 receives the input of the AF signal output from the AFIC 10, and after performing a predetermined calculation to convert the AF signal into a distance signal, sends the distance signal to a lens drive circuit 7. The lens drive circuit 7 makes a photographic lens 8 perform focusing operation based on the distance signal.

Figure 4:
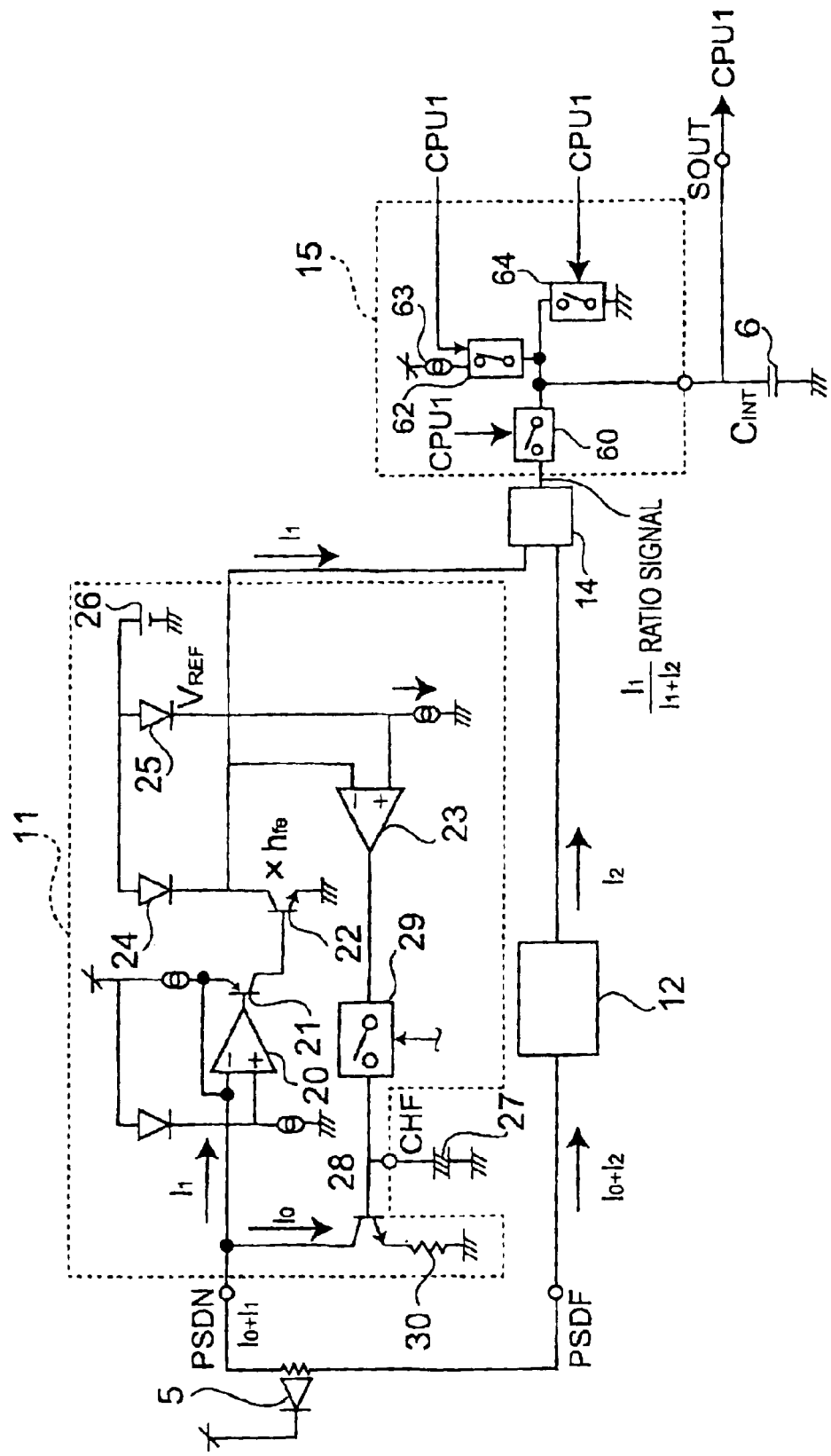
FIG. 4 is a diagram showing the circuit configuration of a first signal processing circuit and an integration circuit in the distance measuring device in accordance with the embodiment.

FIG. 4 is a diagram showing a concrete configuration of the first signal processing circuit 11 and the output circuit 15 in the AFIC 10. The second signal processing circuit 12 has the same configuration of the circuit as that of the first signal processing circuit 11.

As shown in FIG. 4, the first signal processing circuit 11 inputs the short-range side signal $I_1$ including the component of the ambient light $I_0$, which is output from the PSD 5, and after removing the component of the ambient light $I_0$, outputs the short-range side signal $I_1$. The current $(I_1+I_0)$, which is output from the near-side terminal of the PSD 5, is input to the negative input terminal of an operational amplifier 20 in the first signal processing circuit 11 through the PSDN terminal of the AFIC 10. The output terminal of the operational amplifier 20 is connected to the base terminal of a transistor 21; and the collector terminal of the transistor 21 is connected to the base terminal of the transistor 22. Connected to the collector terminal of the transistor 22 is the negative input terminal of the operational amplifier 23; and connected to the collector terminal is the cathode terminal of a compression diode 24. Further, connected to the positive input terminal of the operational amplifier 23 is the cathode terminal of a compression diode 25; and connected to the anode terminal of each of the compression diodes 24 and 25 is a first reference power supply 26.

Further, externally connected to the CHF terminal of the AFIC 10 is a ambient light removal capacitor 27. The ambient light removal capacitor 27 is connected to the base terminal of a ambient light removal transistor 28 in the first signal processing circuit 11. The fixed light removal capacitor 27 and the operational amplifier 23 are connected to each other being interposed by a switch 29. The CPU 1 controls the ON/OFF operation of the switch 29. The collector terminal of the fixed light removal transistor 28 is connected to the negative input terminal of the operational amplifier 20. The emitter terminal of the transistor 28 is connected to a resistance 30 of which another terminal is grounded.

On the other hand, referring to FIG. 4, the output circuit 15 is provided with an integration capacitor 6, which is externally connected to the CINT terminal of the AFIC 10. The integration capacitor 6 is connected to the output terminal of the arithmetic circuit 14 through a switch 60; and connected to a current generator 63 through a switch 62; and further grounded through a switch 64. These switches 60, 62 and 64 are controlled by the control signal from the CPU 1. When the switch 62 is turned on, the integration capacitor 6 is charged from the current generator 63. On the other hand, when the switch 64 is turned on, the integration capacitor 6 is discharged.

Figure 5:
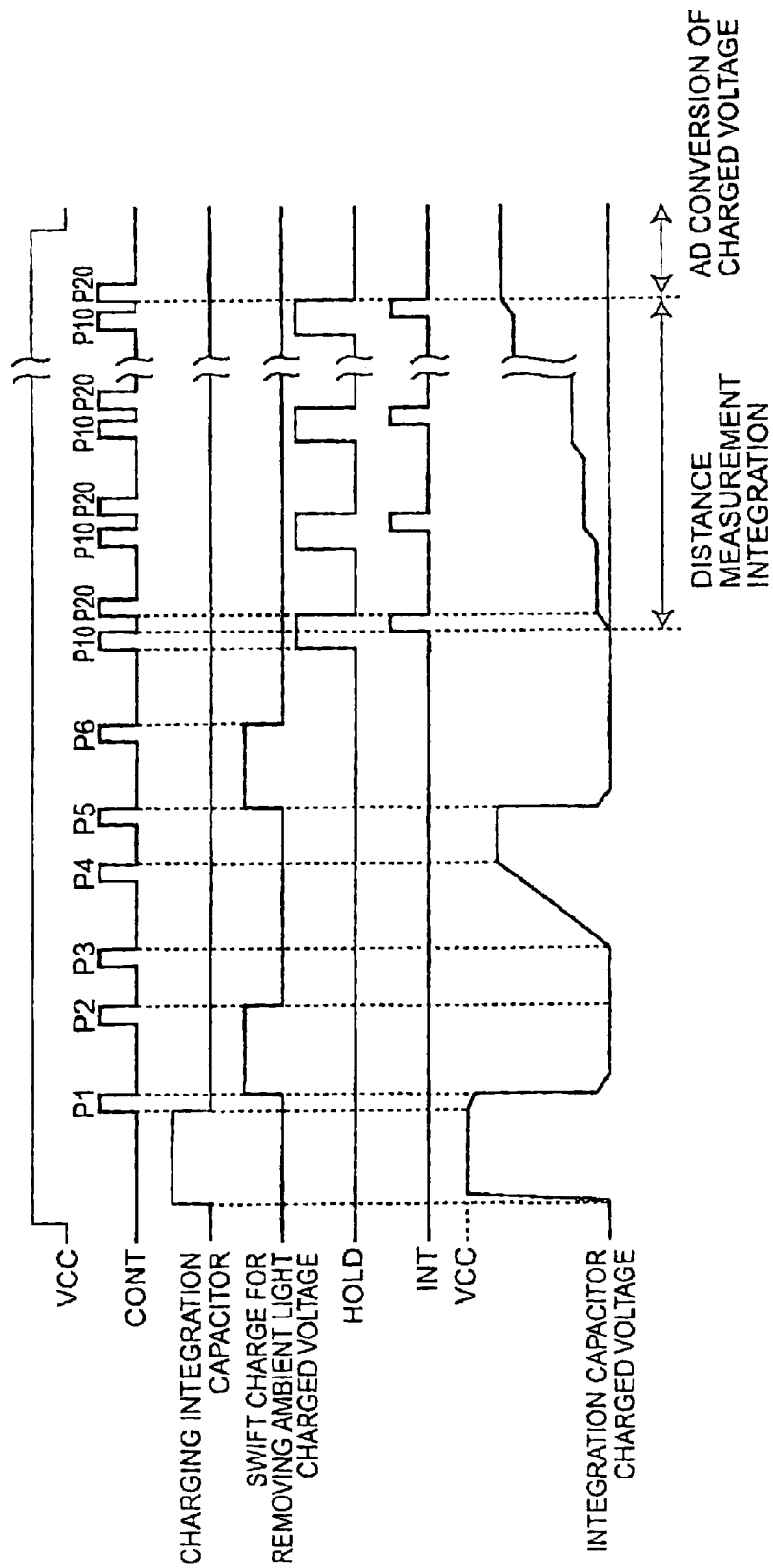
FIG. 5 is a timing chart for illustrating the operation of the distance measuring device in accordance with the embodiment.

Next, the operation of the distance measuring device in accordance with the embodiment will be described. FIG. 5 is a timing chart with respect to the operation of the distance-measuring device. When an operation of the camera such as shutter release is made, the distance measuring processing is started and the AFIC 10 begins to be supplied with the power. That is, a control signal is output from the CPU 1 to the driver 3, and the power supply voltage is supplied from the driver 3 to the AFIC 10. In the AFIC 10, receiving the power supply, the integration capacitor 6 is charged. The integration capacitor 6 is charged as a dielectric absorption measure of the integration capacitor 6.

Then, after a predetermined time has elapsed from the charge of the integration capacitor 6, a pulse P1 is input to the AFIC 10 from the CPU 1 as a control signal (CONT). When the pulse P1 falls, the charged voltage of the integration capacitor 6 is discharged, and the ambient light removal capacitor 27 is charged swiftly. After that, a pulse P2 is input from the CPU 1 as a control signal, and the swift charge of the ambient light removal capacitor 27 is terminated.

When a pulse P3 as a control signal is input, corrective integration is carried out. The corrective integration is carried out by allowing a predetermined current to flow to the integration capacitor 6 in a predetermined period of time. Then, a pulse P4 as a control signal is input, and the charged voltage of the integration capacitor 6 is A/D converted and read by the CPU 1.

In the CPU 1, the capacity of the integration capacitor 6 is calculated from the A/D converted voltage value. By performing the correction on the result of the distance measuring calculation based on the actually measured capacity, accuracy in the distance measurement is improved.

Then, when a pulse P5 as a control signal is input and the pulse P5 falls, the integration capacitor 6 is discharged, and the ambient light removal capacitor 27 is charged swiftly. After that, a pulse P6 as a control signal is input, and the swift charge of the ambient light removal capacitor 27 is terminated.

Thus, the distance measuring routine is performed predetermined number of times. That is, the IRED 4 projects the light onto the object to be measured predetermined number of times at predetermined intervals, and at every light projection, the PSD 5 receives the reflected light from the object to be measured and outputs the near-side and long-range side signals. The output ratio signal is calculated based on the output near-side and long-range side signals. The voltage corresponding to the output ratio signal is repeatedly charged into the integration capacitor 6. After completing the charge of predetermined number of times, the charged voltage of the integration capacitor 6 is A/D converted and read by the CPU 1; and based on the A/D converted value, the distance to the object to be measured is calculated. The distance measuring operation may be performed in such manner that a predetermined voltage is previously charged in the integration capacitor 6, and a voltage corresponding to the output ratio signal is repeatedly discharged.

Figure 6:
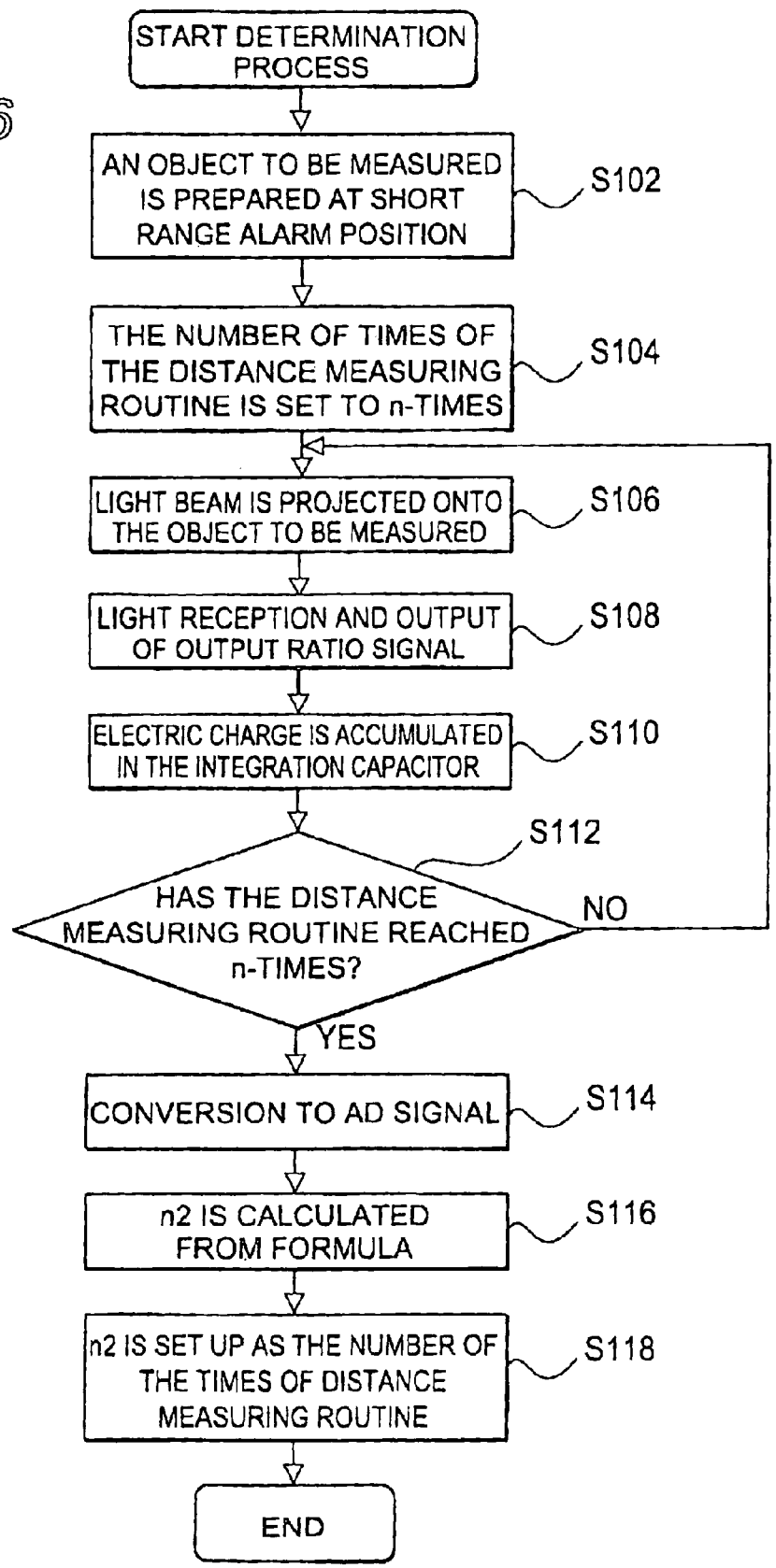
FIG. 6 is a flow chart for illustrating the adjusting method of the distance measuring device in accordance with the embodiment.

Next, the setting of the number of times of the distance measuring routine in the distance measuring device in accordance with the embodiment will be described with reference to the flow chart in FIG. 6. In this setting method, an appropriate number of times of the distance measuring routine for each product is determined and stored in the EEPROM 2 prior to the shipment from the plant. First of all, an object to be measured with an infrared light reflectance of 36% is prepared at a short range alarm position away from the distance measuring device (S102). Using the object to be measured as an object, the number of times of the distance measuring routine of the distance measuring device is set to a temporal number of times (n-times) (S104), and the distance measuring operation is carried out to obtain an AD signal. That is, a light beam is projected onto the object to be measured from the light projecting means (S106), the output ratio signal is output from a calculation means (S108) corresponding to the reflected light, which is received by the light receiving means; thus electric charge is accumulated in the integration capacitor (S110). The above operation is repeated n-times at every pulse light (S112); thus the electric charge of n-times is accumulated in the integration capacitor as integration means. The voltage of the integration capacitor, in which the electric charge has been accumulated, is converted into an AD signal by means of AD conversion means (S114). In this case, an appropriate number of times n is selected in the following assumed difference range; that is, in an individual product of which capacity of the integration capacitor is the smallest and the integrated current is the largest, the integration capacitor is not saturated. Accordingly, the AD signal value (referred to as "AFDATA"), which is obtained in S114, is always resulted in a smaller value than the AD signal value (referred to as "ADMAX"), which is obtained when the integration capacitor is saturated.

The appropriate number of times of the distance measuring routine (referred to as $n_2$) for the individual distance measuring device is calculated as the number of times in which n is multiplied by the ratio between the ADMAX and the AFDATA. That is, $n_2$ is calculated using the following mathematical expression (1) (S116):

$$n_2 = n \cdot ADMAX/AFDATA \qquad (1).$$

In case where the integration capacitor is discharged from the initial voltage state as the distance measuring routine is performed, $n_2$ is calculated using the following mathematical expression (2):

$$n_2 = n \cdot ADMAX/(ADMAX - AFDATA) \qquad (2);$$

provided that ADMAX in this case represents the initial voltage (fully charged voltage) at the time when the distance measuring routine is initiated where the AD signal value is proportional to the voltage value of the integration capacitor.

The obtained $n_2$ is set as the number of times of the distance measuring routine for the distance measuring device (S118), and the setting of the number of times is terminated.

The number of times of the distance measuring routine and the AD signal value are generally proportional to each other, and the proportionality constant depends on the characteristics of the circuits in the individual distance measuring device and the distance of the object. Accordingly, from the number of times of $n_2$ of the distance measuring routine, which is obtained by the mathematical expression (1), the AD signal value, when an object to be measured at a short range alarm position is measured, is resulted in a value that is almost the same as the ADMAX. In this case, the integration capacitor is in the saturated state.

Figure 7:
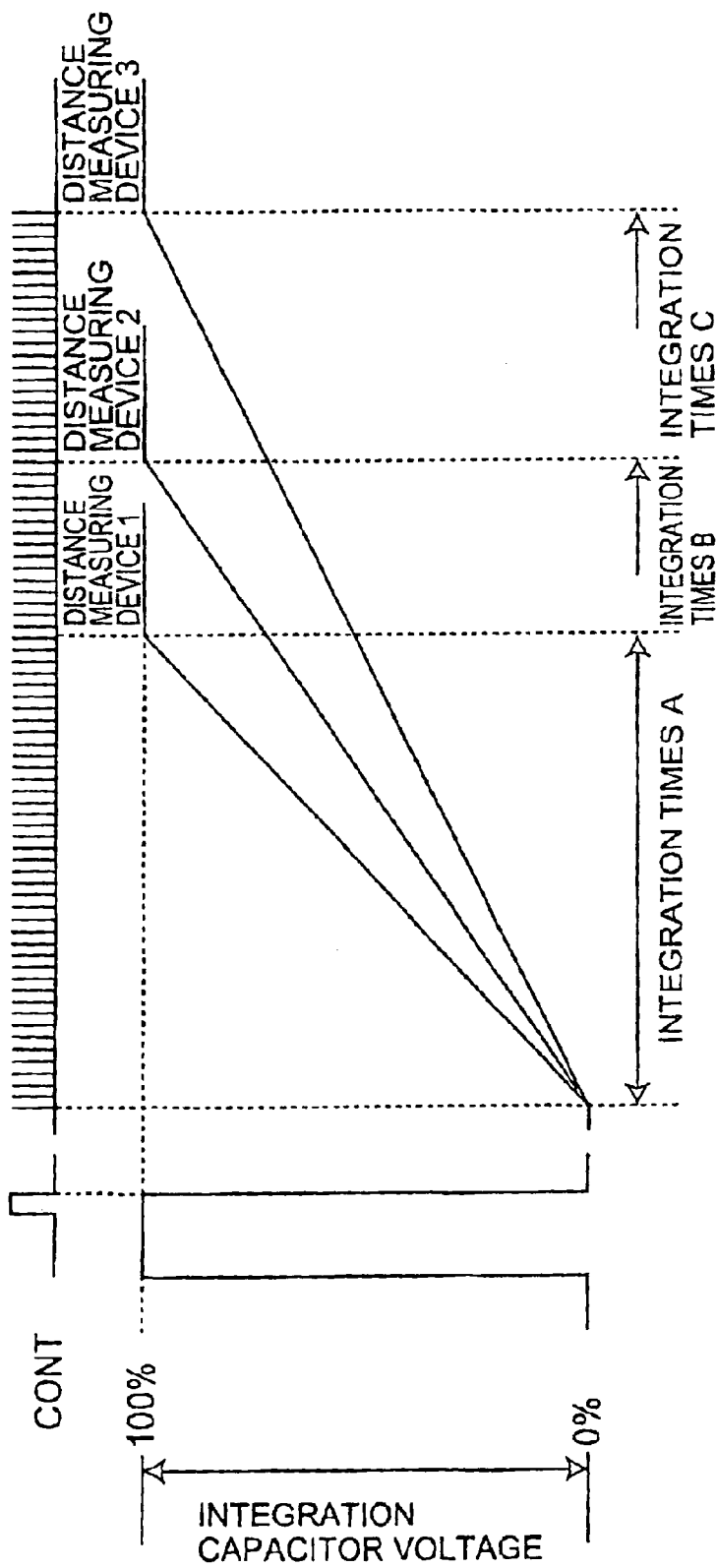
FIG. 7 is a timing chart for illustrating the operation of the distance measuring device in accordance with the embodiment.
Figure 8:
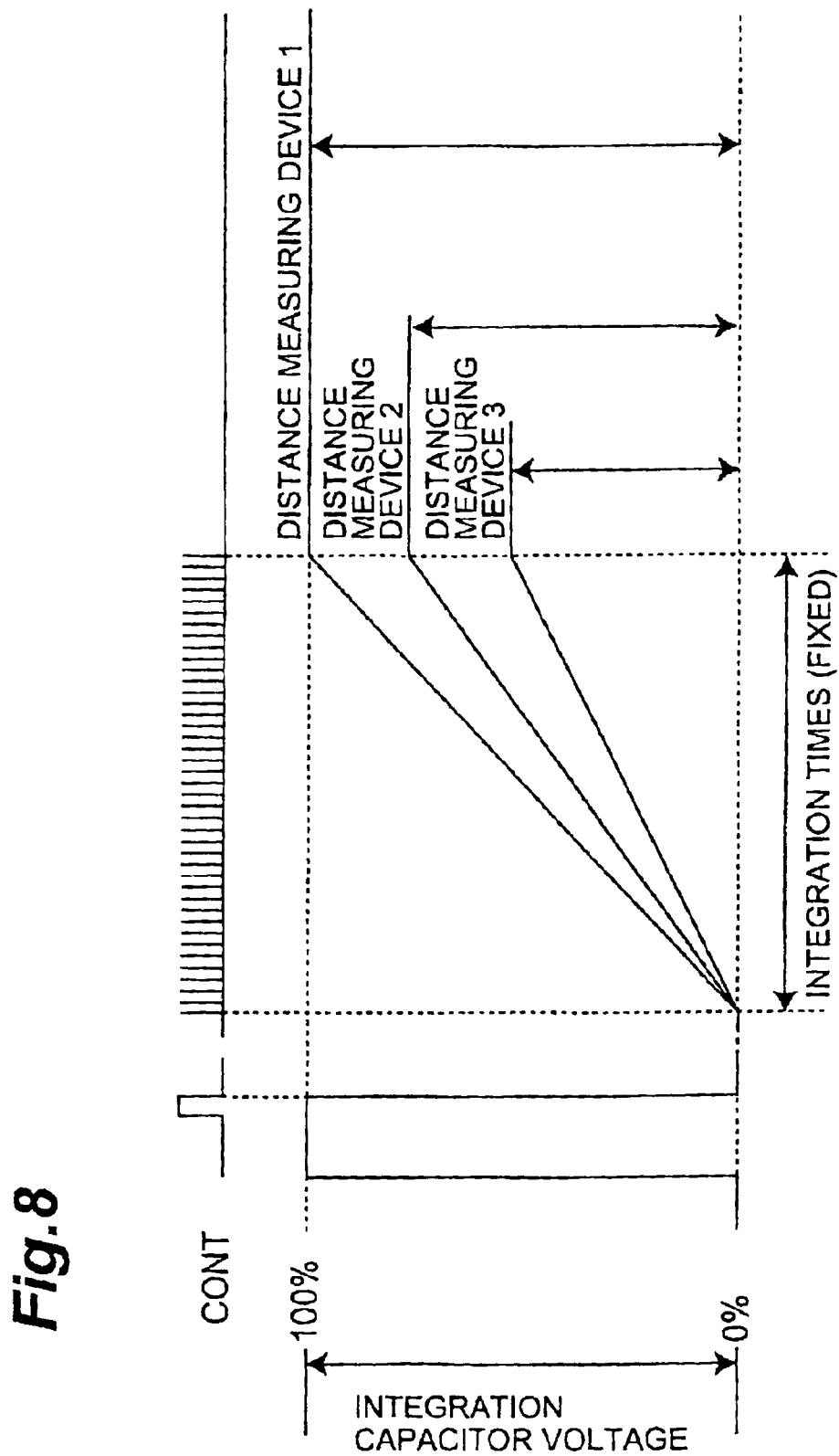
FIG. 8 is a timing chart for illustrating the operation of a conventional distance measuring device.

FIG. 7 is a timing chart for the distance measuring device in accordance with the embodiment, in the case where a camera carries out the distance measuring operation at the closest distance capable of photographing. The abscissa axis represents integration time; the ordinate axis represents voltage of the integration capacitor. As shown in FIG. 7, in an individual product (distance measuring device 1) of which capacity of the integration capacitor is the smallest and the integration current is largest, a small number of times of the distance measuring routine A is set. Contrarily, in an individual product (distance measuring device 3) of which capacity of the integration capacitor is the largest and the integration current is smallest, a large number of times of the distance measuring routine A is set up. Also, in many average individual products (distance measuring device 2), an appropriate number of times of the distance measuring routine B, which is between the above two, is set up. In any of the distance measuring devices, an appropriate number of times of the distance measuring routine corresponding to the characteristics of the circuits is set up; thereby electric charge is accumulated until the voltage of the integration capacitor is substantially saturated.

As described above, by setting the voltage of the integration capacitor, which is obtained at the short range alarm position, to the maximum value, the range of distance from the short range alarm position to the infinite distance corresponds to the range from the maximum voltage to the minimum voltage of the integration capacitor as it is. Accordingly, since the full range of the integration capacitor voltage can be utilized, the resolution of the distance measuring device is increased; thus the accuracy of the distance measurement can be increased.

However, when the number of times of the distance measuring routine is determined in accordance with the above-described adjustment method, as shown in FIG. 7, the number of times, which is larger than the number of times of the distance measuring routine in conventional distance measuring device, is set up. That is, the distance measuring time becomes longer than that of the conventional distance measuring device. Therefore, in the distance measuring device that uses the above-described adjustment method, in order to reduce the distance measuring time, it is preferred that the capacity of the integration capacitor is designed to be smaller than that of the conventional one.

Further, the present invention is not limited to the above-described embodiment, but various modifications are possible. In the above-described embodiment, the present invention is applied to a camera with an active distance measuring system. In the case of camera in which the active distance measuring system is used, the present invention can be applied, for example, to electronic still cameras as well as video cameras.

As described above, according to the present invention, a distance measuring device capable of increasing the accuracy of the distance measurement without requiring any complicated distance measuring processing.

What is claimed is:

1. A distance measuring device, comprising:
   light projecting means for projecting light onto an object at a distance to be measured;
   light detecting means for detecting light of the light projected to and reflected from the object and outputting a first signal corresponding to the distance to the object;
   integration means comprising an integration capacitor, for integrating the first signal by charging said integration capacitor according to the first signal;
   analog-to-digital (AD) conversion means for converting the voltage of said integration capacitor, after a predetermined number of distance measuring routines, including light projection by said light projecting means, light detection by said light detecting means and charging of said integration capacitor from a predetermined initial voltage level, into a digital signal as a second signal; and
   distance determination means for determining the distance to the object based on the second signal, wherein the predetermined number of the distance measuring routines to be performed is set so said integration capacitor, from the initial voltage level, substantially reaches a saturation voltage level of said integration capacitor when the distance measuring routines are performed, when the object is located at a short-range alarm position.

2. A distance measuring device, comprising:
   light projecting means for projecting light onto an object at a distance to be measured;
   light detecting means for detecting light of the light projected to and reflected from the object and outputting a first signal corresponding to the distance to the object;
   integration means comprising an integration capacitor, for integrating the first signal by discharging said integration capacitor according to the first signal;
   analog-to-digital (AD) conversion means for converting the voltage of said integration capacitor, after a predetermined number of distance measuring routines, including light projection by said light projecting means, light detection by said light detecting means and discharging of said integration capacitor from a predetermined initial voltage level, into a digital signal as a second signal; and
   distance determination means for determining the distance to the object based on the second signal, wherein the predetermined number of the distance measuring routines to be performed is set so said integration capacitor, from the initial voltage level, substantially reaches an uncharged state when the distance measuring routines are performed on the condition that the object is placed at a short-range alarm position.

3. The distance measuring device according to claim 1, wherein
   said distance measuring device is applied to a camera, and
   the short-range alarm position is the position closest to said camera of an object capable of being photographed by said camera.

4. The distance measuring device according to claim 2, wherein
   said distance measuring device is applied to a camera, and
   the short-range alarm position is the position closest to said camera of an object capable of being photographed by said camera.

5. The distance measuring device according to claim 1, wherein
   said distance measuring device is applied to a camera, and
   the short-range alarm position is the nearest position that can be made a focal point by said camera.

6. The distance measuring device according to claim 2, wherein
   said distance measuring device is applied to a camera, and
   the short-range alarm position is the nearest position that can be made a focal point by said camera.

7. The distance measuring device according to claim 1, wherein
   the distance measuring routine is repeated n times when the object is placed at the short-range alarm position, and then a value of the second signal is obtained as AFDATA,
   the number of the distance measuring routines to be performed is determined by the following numerical equation $$n_2 = n \cdot ADMAX/AFDATA,$$

provided that,
   $n_2$ is the number of the distance measuring routines to be performed, and ADMAX is a value of the second signal which is obtained when said integration capacitor is at the saturation voltage level.

8. The distance measuring device according to claim 7, wherein
   the voltage level of said integration capacitor increases as the object is placed closer to the distance measuring device,
   the initial voltage level is an uncharged level, and
   the saturation voltage level is a fully charged level.

9. The distance measuring device according to claim 7, wherein the value of the second signal is proportional to the charge in said integration capacitor.

10. The distance measuring device according to claim 2, wherein the distance measuring routine is repeated n times when the object is placed at the short-range alarm position, and then a value of the second signal is obtained as AFDATA, the number of the distance measuring routines to be performed is determined by the following numerical equation $$n_2 = n \cdot ADMAX/(ADMAX - AFDATA),$$

provided that, $n_2$ is the number of the distance measuring routines to be performed, and ADMAX is a value of the second signal which is obtained when said integration capacitor is at the saturation voltage level.

11. The distance measuring device according to claim 10, wherein the voltage level of said integration capacitor decreases as the object is placed closer to the distance measuring device, and the initial voltage level is a fully charged level.

12. The distance measuring device according to claim 10, wherein the value of the second signal is proportional to the voltage of said integration capacitor.

* * * * *

UNITED STATES PATENT AND TRADEMARK OFFICE
CERTIFICATE OF CORRECTION

PATENT NO.    : 6,944,397 B2
DATED         : September 13, 2005
INVENTOR(S)   : Yasuhiro Miwa It is certified that error appears in the above-identified patent and that said Letters Patent is hereby corrected as shown below:

Title page,
Item [56], References Cited, U.S. PATENT DOCUMENTS, add:
-- 6,472,652 B1     10/2002     Miwa --.
FOREIGN PATENT DOCUMENTS, add:
-- JP            2001-153647            6/2001 --.

Signed and Sealed this

Sixth Day of December, 2005

JON W. DUDAS
*Director of the United States Patent and Trademark Office*